United States Patent [19]

Hall et al.

[11] Patent Number: 4,731,554
[45] Date of Patent: Mar. 15, 1988

[54] LOW PROFILE RING-SHAPED MOTOR

[75] Inventors: Robert D. Hall, Berkey; Jeffrey T. Major, Cygnet, both of Ohio

[73] Assignee: Allied Corporation, Morris County, N.J.

[21] Appl. No.: 798,062

[22] Filed: Nov. 14, 1985

[51] Int. Cl.$^4$ .......................... H02K 1/06; H02K 21/12
[52] U.S. Cl. ................................... 310/67 R; 310/156; 310/266
[58] Field of Search ..................... 310/67 R, 154, 156, 310/261, 164, 266

[56] References Cited

U.S. PATENT DOCUMENTS

| | | | |
|---|---|---|---|
| 2,553,292 | 5/1951 | Barrett | 310/237 |
| 2,880,335 | 3/1959 | Dexter | 310/216 |
| 3,354,333 | 11/1967 | Henry-Baudot | 310/268 |
| 4,103,196 | 7/1978 | Saito et al. | 310/266 |
| 4,114,057 | 7/1978 | Esters | 310/46 |
| 4,286,184 | 8/1981 | Köglet et al. | 310/67 R |
| 4,311,933 | 1/1982 | Riggs et al. | 310/67 R |
| 4,334,163 | 6/1982 | Ascoli | 310/154 |
| 4,360,751 | 11/1982 | Arnold, Jr. et al. | 310/60 R |
| 4,459,501 | 7/1984 | Fawzy | 310/164 |
| 4,521,706 | 6/1985 | Kudelski et al. | 310/67 R |
| 4,549,104 | 10/1985 | Niimura | 310/67 R |

FOREIGN PATENT DOCUMENTS 25969  7/1953  Finland .

Primary Examiner—Patrick R. Salce
Assistant Examiner—D. L. Rebsch
Attorney, Agent, or Firm—Allegretti, Newitt, Witcoff & McAndrews, Ltd.

[57] ABSTRACT

A low profile ring-shaped motor has a housing, a bearing support attached to the housing and supporting a rotating shaft carrying a ring-shaped rotor. A ring-shaped stator is secured to the housing and is concentric and between the legs of the U-shaped rotor. The stator is formed by a continuous strip of magnetic material wound and laminated in a toroid and having helical windings therearound. On the inside of the legs of the rotor are mounted a plurality of permanent magnets forming the poles of the motor. Radially opposite magnets are of the same polarity. Control of the switching of the current through the windings is by means of Hall Effect devices sensing the change in polarity of a ring shaped magnet means having the same number of poles as does the permanent magnets.

10 Claims, 3 Drawing Figures

U.S. Patent   Mar. 15, 1988   4,731,554
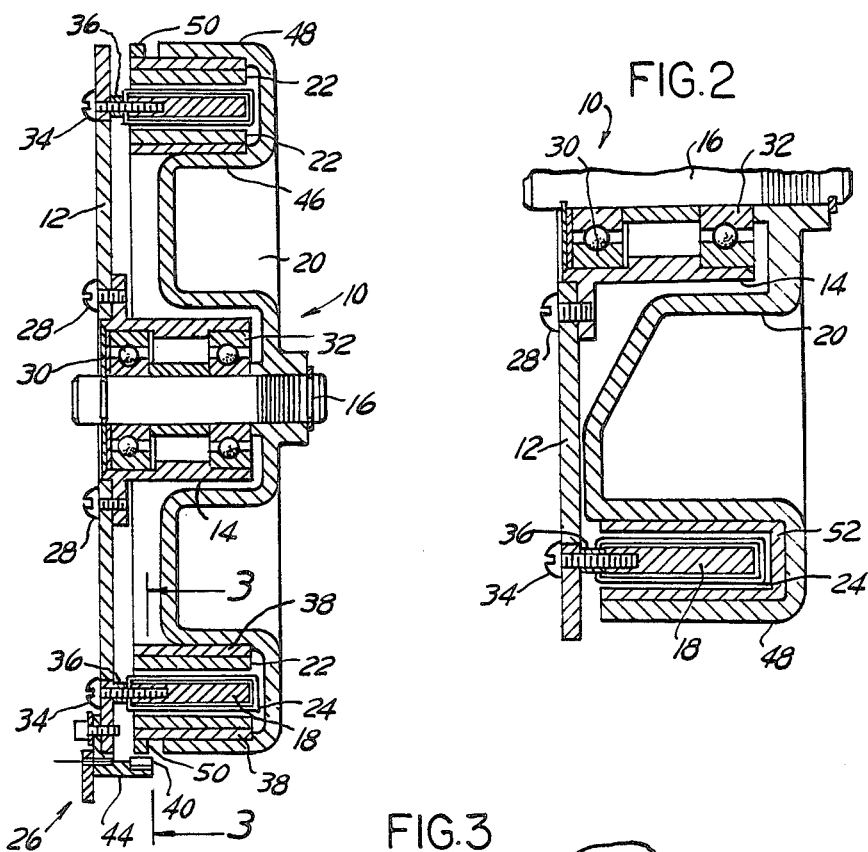
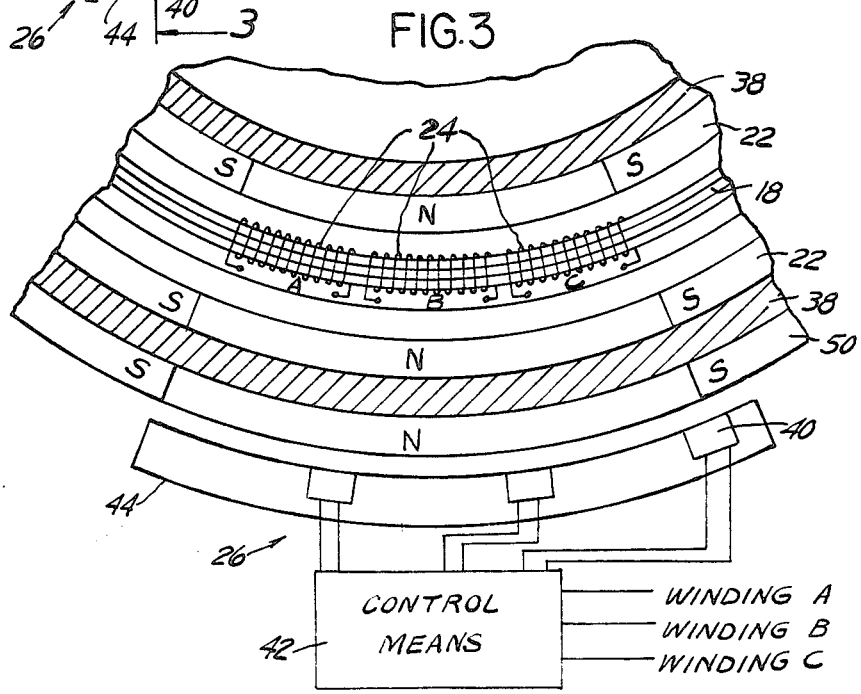

LOW PROFILE RING-SHAPED MOTOR

CROSS REFERENCE TO RELATED APPLICATION

This application is related to U.S. Ser. No. 684,534, now U.S. Pat. No. 4,591,750, filed on Dec. 21, 1984, by Jeffrey T. Major and Robert D. Hall and entitled "Dynamoelectric Machine".

BACKGROUND OF THE INVENTION

In automotive applications, engine cooling is generally accomplished by means of a fan powered either by an electric motor or belt driven from the main drive shaft of the engine. As the design of automobiles changes, the amount of space in the engine compartment generally decreases and the requirement for more compact fan assemblies, as respects axial length, is placed upon the cooling engineer. One such solution is described and defined in U.S. Pat. No. 4,591,750, by Jeffrey T. Major and Robert D. Hall and entitled "Dynamoelectric Machine", which is incorporated herein by reference. That patent is directed to a brush motor. In automobile motors, the useful life of a motor is often equivalent to the life of the brushes. Motor replacement is both an added expense and an inconvenience to the operator.

SUMMARY OF THE INVENTION

The following ring shaped brushless motor accomplishes the goal of having a brushless fan motor that is compact enough to fit in the engine compartment of an automobile. A housing means has a bearing support means for supporting a rotating shaft member. The stator, fabricated from a continuous strip of ferrous material wound as a toroid having a substantially rectangular cross section, is secured to the housing means. The winding on the stator is helically wound, with the beginning and ending leads connected to a control circuit. The rotor, secured to the rotating shaft member for rotation, is radially spaced from the stator and includes a pair of spaced apart steel rings positioned concentric to and on either side of the stator.

For a brushless d.c. motor and synchronous motor, each steel ring has a magnetic means comprising a plurality of alternately poled permanent magnets which are magnetically coupled to the windings on the stator. ELectrical commutation for the brushless D.C. motor is controlled by a sensor means positioned on both the rotor and stator to generate switching signals to the control circuit for switching the current through the windings.

For an induction motor, each steel ring has a ring of conductive material such as copper or aluminum on the surface facing the stator. In both the induction motor and synchronous motor, the sensor means for electrical commutation is replaced by complex means such as an oscillator circuit or simple means such as an alternating current power source.

It is a principle advantage of the ring shaped brushless motor to shorten the axial length of the motor and provide useful work from such shortened motor.

This and other advantages will become apparent from the following detailed description and the accompanying drawings.

DETAILED DESCRIPTION OF THE DRAWINGS

In the drawings:

FIG. 1 is a sectional view of ring shaped brushless motor.

FIG. 2 is a partial sectional view of an induction motor.

FIG. 3 is a partial schematic sectional view of of the motor of FIG. 1 taken along line 3—3.

DETAILED DESCRIPTION

U.S. Pat. No. 4,591,750, by Jeffrey T. Major and Robert D. Hall, is incorporated herein by reference. That patent describes and claims a brush type motor utilizing a continuous strip rotor member wound in the form of a toroid and having a helically wound winding.

The motor described herein uses the same principle to produce either a brushless d.c. motor, a synchronous motor or an induction motor having a continuous strip stator core having a helically wound winding. Of course, each of these motors are different in theory, design and configuration.

A brushless d.c. motor or synchronous motor 10 is illustrated in FIG. 1 and comprises a housing means 12, a bearing support means 14 attached to the housing means 12, a bearing support means 14 attached to the housing means 12 for rotatively supporting a shaft member 16, a ring shaped stator means 18 secured to the housing means 12 and concentric to the bearing support means 14, and a rotor means 20 secured to the rotating shaft member 16 and radially spaced from the stator means 18. Magnetic means 22 is mounted on the rotor means 20 and is magnetically coupled to the windings 24 on the stator means 18. A sensing means 26 is effectively responsive to the polarity change of the magnetic means 22 as indicated by the ring shaped magnet means 50 and operates to switch the current through the winding 24 for controlling the speed of the motor 10. Not shown in FIG. 1 is a fan member which may be attached to the outer peripheral surface of the rotor means 20 and rotated therewith. Depending upon the pitch of the fan blades, the total width of the d.c. motor 10 may be no larger than the depth of the fan blades.

As illustrated in FIG. 1, the housing means 12 is a supporting member to mount the motor 10 to another structure such as a motor vehicle engine or radiator assembly. The housing means 12 and the structure may be a variety of shapes and sizes and are not the subject of the invention.

A bearing support means 14 is attached to the housing means 12 by means such as threaded devices 28 or secured by more permanent means such as welding. In FIG. 1, the bearing support means 14 locates a pair of bearings 30,32 wherein the outer raceway of the bearings is nonrotatively supported. The inner raceway of the bearings is mounted on the shaft member 16, allowing the shaft member 16 to rotate relative to the bearing support means 14.

Outboard of and concentric to the bearing support means 14, the stator means 18 is secured to the housing means 12. In the FIGURE, the stator means 18 is a continuous strip of magnetic material laminated in the shape of a toroidal core, secured by a plurality of spaced apart threaded members 34 to the housing means 12. Between the housing means 12 and the stator means 18 and supporting the stator means 18 in a spaced relationship to the housing means 12 are a plurality of nonmagnetic, nonconductive spacers 36 which function to position the stator means 18 relative to the rotor means 20 and to electrically insulate the stator means 18 from the housing means 12. The threaded members 34 are also nonconductive.

Mounted on the shaft member 16 for rotation therewith is the rotor means 20. The rotor means 20 is U-shaped so as to position a pair of rotor steel back-up ring members 38 concentric with and on either side of the stator means 18. In addition, the rotor means 20 may support a fan blade on its broadside face surface or on a surface concentric to the stator means 18.

Magnetic means 22 is mounted on the rotor means 20 and magnetically coupled to the windings 24 on the stator means 18. The magnetic means 22 for a brushless motor and for a synchronous motor comprises a plurality of alternately poled permanent magnets contiguous to one another.

For a brushless d.c. motor, a sensing means 26 is secured to the housing means 12 and provides means, such as Hall Effect devices 40, to effectively sense the polarity change of the magnetic means 22, as indicated by the ring shaped magnet means 50. As the change of polarity of the magnets identifying the pole positions is sensed, the control means 42 will cause the current flowing through the stator windings 24 to reverse directions. In FIG. 1, the sensing means 26 is mounted on a bracket 44 for positioning three Hall Effect devices 40, as more clearly shown in FIG. 3.

For an induction motor and synchronous motor, the control means 42 may contain an oscillator which functions to switch the current flow at frequency rate which will have the rotor means 20 rotate at a desired speed or, in the alternative, may contain a source of alternating current power. In such an example, the Hall Effect devices are eliminated.

The construction of the stator means 18 in either the brushless d.c. motor, synchronous motor, or the induction motor is substantially the same. The core is wound in a toroid from a continuous strip of ferrous material so that the end result is a layer core wherein each layer is insulated from the layer on either side. The toroidal shape is secured by conventional means, securing the beginning and the ending edges of the strip. The finished core is then electrically insulated in order that the windings, which will be put thereon, are not electrically shorted to the core. The core construction of a continuous strip, instead of a plurality of rings, functions to prevent material waste.

Around the core, which is typically rectangular in shape, are a plurality of windings 24 wound in a single layer in a helical manner. Each loop of the windings 24 is insulated from the next loop and is also insulated from the core. The ends of the windings 24 are brought out to terminals and connected to the control means 42 for switching the flow of current therethrough. As illustrated in FIG. 3, there may be three windings, A, B and C, wound for each permanent magnet 22.

The rotor means 20 for a brushless d.c. motor and synchronous motor is an U-shaped member surrounding the stator means 18. The legs 46,48 of the U-shaped member are concentric to the stator means 18 and along the inside of the legs are a pair of concentric steel or ferrous flux members 38 positioned on either side of the ring shaped stator means 18. Secured on the surface of the flux member 38 nearest the ring stator means 18 is a permanent magnet medium comprised of a plurality of magnetic poles. The magnetic poles are positioned, as shown in FIG. 3, so that the polarity of radially opposed poles are the same. The flux members 38 and the stator means 18 comprise the magnetic circuit between adjacent magnetic poles.

The sensing means 26 for the brushless d.c. motor will have a ring shaped magnet means 50 mounted on the rotor means 20 for rotation therewith so as to indicate the polarity positioning of the magnetic means 22 and the change from one magnetic pole to the next. The ring shaped magnet means 50 has the same number of poles around its periphery as does the magnetic means 22. As stated before, it is the change of the magnet polarity as sensed by a sensor such as a Hall Effect device 40 which operates the control means 42 for switching the flow of current through the stator windings 24.

Referring to FIG. 2, the rotor means 20 for an induction motor has a copper or aluminum ring 52 encircling the stator means 18 on both sides and across one end. If the rotor means 20 is fabricated from copper or aluminum or a similar material, a special ring is not necessary, but if the rotor is fabricated from steel, the copper or aluminum or similar material ring is used. In this construction, very little of the primary winding on the stator is "inactive" or placed outside the magnetic circuits.

The stator means 18 for an induction motor and a synchronous motor has either a single or polyphase winding connected to the control means 42 and the current is switched in time with an oscillator output or the alternating current power output connected to the windings 24 from the control means. The frequency of the oscillator determines the rotational speed of the rotor.

In all motors, the space between the stator and rotor must be maintained and should provide as small an air gap as possible.

There has thus been described a brushless ring shaped motor 10 having a stator means 24 with a toroid core having a single layer of helically wound windings 24 thereon. The rotor means 20 is a U-shaped member concentric to the stator means 18 and having as a magnetic means 50 a plurality appropriately poled magnets along each leg of the U-shaped rotor means 20. The radially opposed magnets 22 have the same polarity. A flux member 38 behind each magnet functions to complete the magnetic circuit.

What is claimed is:

1. A ring-shaped motor comprising, in combination:
    a housing;
    a rotatable shaft;
    a bearing support secured to said housing for rotatably supporting said shaft;
    a ring-shaped stator secured to said housing concentric with said bearing support, said stator including a laminated core with a plurality of helical windings thereon;
    a rotor secured to said rotatable shaft and rotatable therewith, said rotor including a base and two substantially concentric rims extending from said base, both of said rims substantially concentric with and on opposite sides of said stator; and
    control means for applying electrical power to said windings.

2. A ring-shaped, brushless motor comprising, in combination:
    a housing;
    a rotatable shaft;

a bearing support secured to said housing for rotatably supporting said shaft;

a ring-shaped stator secured to said housing concentric with said bearing support, said stator including a laminated core with a plurality of helical windings thereon;

a rotor secured to said rotatable shaft and rotatable therewith, said rotor including a base and inner rim extending from said base, said rim being substantially concentric with said stator;

an inner magnetic ring attached to said inner rim of said rotor, and inner magnetic ring including a predetermined number of substantially contiguous magnets;

sensing means, mounted on said housing, for sensing a polarity change of said inner magnetic ring as said rotor rotates past said sensing means and responsively issuing a control signal; and control means, interconnected to said sensing means, for receiving said control signal and responsively applying electrical power to said helical windings.

3. A ring-shaped motor comprising, in combination:

a housing;

a rotatable shaft;

a bearing support secured to said housing for rotatably supporting said shaft;

a ring-shaped stator secured to said housing concentric with said bearing support, said stator including a laminated core with a plurality of helical windings thereon;

a rotor secured to said rotatable shaft and rotatable therewith, said rotor including a base and inner and outer substantially concentric rims extending from said base, both of said rims substantially concentric with and on opposite sides of said stator;

an inner magnetic ring attached to said inner rim of said rotor, said inner magnetic ring including a predetermined number of substantially contiguous magnets;

an outer magnetic ring attached to said outer rim of said rotor, said outer magnetic ring including said same predetermined number of substantially contiguous magnets;

sensing means, mounted on said housing, for sensing a polarity change of said inner and outer magnetic rings as said rotor rotates past said sensing means and responsively issuing a control signal; and control means, interconnected to said sensing means, for receiving said control signal and responsively applying electrical power to said helical windings.

4. A motor as claimed in claims 2 or 3 wherein said stator includes at least three helical windings corresponding to each pole pair of said magnet on said first magnetic ring.

5. A motor as claimed in claim 4 further comprising a sensor ring encircling said rotor, said sensor ring including said same predetermined number of magnets, wherein said sensor detects movements of said sensor ring and responsively issues said control signal.

6. A motor as claimed in claim 5 wherein said sensor is a Hall Effect sensor.

7. A motor as claimed in claim 1 wherein said motor is an inductive motor and said rotor comprises a electrically conductive material.

8. A motor as claimed in claim 7 wherein said rotor substantially comprises copper.

9. A motor as claimed in claim 7 wherein said rotor substantially comprises aluminum.

10. A motor as claimed in claim 1 wherein said motor is an inductive motor, and said rotor comprises a magnetically and electrically conductive material, and wherein said motor further comprises an electrically conductive layer between said rotor and said windings, said conductive layer attached to said rotor.

* * * * *